United States Patent
McComb

(10) Patent No.: US 11,346,374 B2
(45) Date of Patent: May 31, 2022

(54) FLUID PULSATION DAMPENERS

(71) Applicant: BLACOH FLUID CONTROLS, INC., Riverside, CA (US)

(72) Inventor: David Dean McComb, Highland, CA (US)

(73) Assignee: BLACOH FLUID CONTROLS, INC., Riverside, CA (US)

( * ) Notice: Subject to any disclaimer, the term of this patent is extended or adjusted under 35 U.S.C. 154(b) by 0 days.

(21) Appl. No.: 17/014,824

(22) Filed: Sep. 8, 2020

(65) Prior Publication Data

US 2022/0074432 A1 Mar. 10, 2022

(51) Int. Cl.
*F15B 1/10* (2006.01)
*F16J 3/04* (2006.01)
*F16L 55/053* (2006.01)

(52) U.S. Cl.
CPC .............. *F15B 1/103* (2013.01); *F16J 3/041* (2013.01); *F16L 55/053* (2013.01); *F15B 2201/20* (2013.01); *F15B 2201/3153* (2013.01); *F15B 2201/32* (2013.01); *F15B 2201/41* (2013.01)

(58) Field of Classification Search
CPC .. F04B 43/0063; F04B 43/084; F04B 43/088; F15B 1/14; F15B 1/103; F15B 2201/2153; F15B 2201/3157
USPC ........... 138/26, 30, 31; 417/472, 540; 92/34, 92/43, 45
See application file for complete search history.

(56) References Cited

U.S. PATENT DOCUMENTS

| 461,997 | A | 10/1891 | Choen |
| 916,136 | A | 3/1909 | Ford |
| 1,648,046 | A | 11/1927 | Fulton |
| D96,405 | S | 7/1935 | Murphy |
| 2,261,948 | A | 11/1941 | Beach |
| 2,341,556 | A | 3/1944 | Joy |
| 2,504,424 | A | 4/1950 | Kraak |
| 2,523,826 | A | 9/1950 | Heinzelman |
| D160,948 | S | 11/1950 | Kisling |

(Continued)

FOREIGN PATENT DOCUMENTS

| DE | 804 635 C | 4/1951 |
| GB | 668451 | 3/1952 |

(Continued)

OTHER PUBLICATIONS

Hidracar S.A., Can you Recognize a Good Design?, Pumps & Systems, Oct. 2016.
Blacoh Fluid Control, Sentry XP Series.

*Primary Examiner* — Patrick F Brinson
(74) *Attorney, Agent, or Firm* — Knobbe, Martens, Olson & Bear

(57) ABSTRACT

A pulsation dampener includes: a housing having in internal cavity; an expandable bellows positioned within the internal cavity of the housing, the expandable bellows having a proximal end, a distal end, and an expandable portion between the proximal and distal ends; a bellows support member coupled to an interior side of the distal end of the expandable bellows and extending longitudinally away from the distal end of the expandable bellows toward the proximal end of the expandable bellows; and a cap fixed with respect to the housing and positioned to support the bellows support member when the expandable bellows is in a longitudinally compressed configuration.

19 Claims, 6 Drawing Sheets

(56) References Cited

U.S. PATENT DOCUMENTS

| | | |
|---|---|---|
| 2,540,424 A | 2/1951 | Bures et al. |
| D162,663 S | 3/1951 | Kisling |
| D163,483 S | 5/1951 | Reichelderfer et al. |
| 2,593,316 A | 4/1952 | Kraft |
| 2,633,146 A | 3/1953 | Witt |
| 2,638,932 A | 5/1953 | Alexander |
| 2,677,393 A | 5/1954 | Cornelius |
| 2,861,595 A | 11/1955 | Pier |
| 2,774,374 A | 12/1956 | Schneider |
| 2,829,857 A * | 4/1958 | Williams .............. F16K 31/126 251/28 |
| 2,838,073 A | 6/1958 | DiMattia et al. |
| 2,875,787 A | 3/1959 | Evans |
| 2,908,294 A | 10/1959 | DiMattia et al. |
| 3,020,928 A | 2/1962 | Harold |
| 3,052,378 A | 9/1962 | Wright et al. |
| 3,063,470 A | 11/1962 | Forster |
| 3,091,258 A | 5/1963 | Marette |
| 3,103,234 A | 9/1963 | Washburn |
| 3,143,144 A | 8/1964 | Harold |
| D199,376 S | 10/1964 | Uttermohlen |
| D199,937 S | 12/1964 | Palmer |
| 3,162,371 A | 12/1964 | Palmer |
| 3,314,276 A | 4/1967 | Peyton et al. |
| 3,418,708 A | 12/1968 | Siver |
| 3,424,201 A | 1/1969 | Sugimura et al. |
| 3,470,910 A | 10/1969 | Loveless |
| 3,473,565 A | 10/1969 | Blendermann |
| D218,519 S | 8/1970 | Hisyaoshi |
| 3,536,102 A | 10/1970 | Zahid et al. |
| 3,601,128 A | 8/1971 | Hakim |
| 3,878,867 A | 4/1975 | Dirks |
| 3,935,882 A | 2/1976 | Matthews |
| 3,974,862 A | 8/1976 | Fuhrmann |
| 4,032,265 A | 6/1977 | Miller |
| 4,052,852 A | 10/1977 | Hart |
| 4,190,403 A | 2/1980 | Glover |
| 4,215,726 A | 8/1980 | Tagami |
| 4,273,158 A | 6/1981 | Chun |
| 4,483,665 A | 11/1984 | Hauser |
| 4,512,514 A | 4/1985 | Elcott |
| D282,562 S | 2/1986 | Looney |
| 4,585,400 A | 4/1986 | Miller |
| 4,610,369 A | 9/1986 | Mercier |
| 4,636,226 A | 1/1987 | Canfora |
| 4,642,833 A | 2/1987 | Stoltz et al. |
| 4,651,781 A | 3/1987 | Kandelman |
| 4,690,245 A | 9/1987 | Gregorich et al. |
| 4,696,684 A | 9/1987 | Shen |
| 4,705,077 A | 11/1987 | Sugimura |
| 4,732,175 A | 3/1988 | Pareja |
| 4,759,387 A | 7/1988 | Arendt |
| 4,782,204 A | 11/1988 | Gartland |
| 4,802,507 A | 2/1989 | Wilson |
| 4,814,688 A | 3/1989 | Colles |
| 4,817,688 A | 4/1989 | Corniea |
| 4,886,432 A | 12/1989 | Kimberlin |
| 4,936,383 A | 6/1990 | Towner et al. |
| D310,262 S | 8/1990 | Lemire |
| 5,015,002 A | 5/1991 | Goodman et al. |
| 5,050,438 A | 9/1991 | Ezell, Jr. |
| 5,065,788 A | 11/1991 | McManigal et al. |
| 5,171,134 A | 12/1992 | Morgart et al. |
| 5,186,209 A | 2/1993 | McManigal et al. |
| 5,253,374 A | 10/1993 | Langill |
| D341,187 S | 11/1993 | Stachiowak |
| 5,307,782 A | 5/1994 | Davis |
| 5,318,073 A | 6/1994 | Kendrick et al. |
| 5,345,857 A | 9/1994 | Murphy |
| 5,372,116 A | 12/1994 | Davis |
| 2,712,831 A | 7/1995 | Day |
| 5,465,576 A | 11/1995 | Miller |
| 5,505,327 A | 4/1996 | Witt |
| 5,562,429 A | 10/1996 | Romstad et al. |
| 5,718,952 A | 2/1998 | Zimmermann et al. |
| 5,771,936 A | 6/1998 | Sasaki et al. |
| 5,772,414 A | 6/1998 | Kaneko |
| 5,772,899 A | 6/1998 | Snodgrass et al. |
| 5,798,156 A | 8/1998 | Mitlitsky et al. |
| 5,848,617 A | 12/1998 | Enomoto |
| 5,858,617 A | 1/1999 | Nakayama et al. |
| 5,860,452 A | 1/1999 | Ellis |
| 5,937,895 A | 8/1999 | Le Febre et al. |
| 5,941,283 A | 8/1999 | Forte |
| 6,041,820 A | 3/2000 | Boehme |
| 6,041,821 A | 3/2000 | Kurt |
| 6,089,837 A | 7/2000 | Cornell |
| 6,173,735 B1 | 1/2001 | Pery, Jr. et al. |
| 6,264,069 B1 | 7/2001 | Hughes et al. |
| D447,792 S | 9/2001 | Renaud |
| 6,318,978 B1 | 11/2001 | Burns |
| 6,386,509 B1 | 5/2002 | Matsuzawa et al. |
| 6,390,131 B1 | 5/2002 | Kilgore |
| D460,536 S | 7/2002 | Renaud |
| D484,953 S | 1/2004 | Renaud |
| 6,948,479 B1 | 9/2005 | Raney et al. |
| 7,066,211 B2 | 6/2006 | Gustaffson |
| 7,108,015 B2 | 9/2006 | Lombari et al. |
| 7,140,406 B2 | 11/2006 | Gustaffson |
| 7,165,535 B2 | 1/2007 | Braun et al. |
| 7,306,006 B1 | 12/2007 | Cornell |
| 7,353,845 B2 | 4/2008 | Underwood et al. |
| 7,887,305 B2 | 2/2011 | Yajima |
| 7,921,882 B2 | 4/2011 | Gebhardt |
| 8,176,940 B2 * | 5/2012 | Lehnert .................. F15B 1/021 138/31 |
| D675,721 S | 2/2013 | Frank |
| D675,722 S | 2/2013 | Frank |
| 8,733,392 B2 | 5/2014 | Smith et al. |
| 8,875,741 B2 | 11/2014 | Lee |
| 9,915,957 B2 | 3/2018 | Brice |
| 10,353,409 B2 | 7/2019 | McComb et al. |
| 10,508,750 B2 | 12/2019 | Burris |
| D893,678 S | 8/2020 | McComb et al. |
| 2004/0016466 A1 | 1/2004 | Lombari et al. |
| 2004/0129325 A1* | 7/2004 | Bleeck .................. F16K 17/04 138/30 |
| 2005/0238504 A1 | 10/2005 | Yajima |
| 2005/0278841 A1 | 12/2005 | Coronado et al. |
| 2006/0054232 A1 | 3/2006 | Gustafsson |
| 2014/0081217 A1 | 3/2014 | Holtwick |
| 2014/0203198 A1 | 7/2014 | Jennings et al. |
| 2015/0027567 A1 | 1/2015 | Shreve et al. |
| 2017/0298914 A1 | 10/2017 | Mori et al. |
| 2018/0306210 A1* | 10/2018 | Arikawa .................. F15B 1/14 |
| 2019/0332130 A1 | 10/2019 | McComb et al. |
| 2020/0300400 A1 | 9/2020 | Burke et al. |

FOREIGN PATENT DOCUMENTS

| | | |
|---|---|---|
| WO | WO 2018/106547 | 6/2018 |
| WO | WO 2019/169349 | 9/2019 |

\* cited by examiner

FLUID PULSATION DAMPENERS

BACKGROUND

Field

This disclosure generally relates to systems, methods, and devices for dampening pulsations in fluid piping systems.

Description

Hydraulic systems, such as fluid piping systems, are used to transport fluid under pressure in various applications. A fluid pump used in such systems creates pulsations that can cause a number of issues, including wearing out components of the pump and other portions of the system over time. A fluid pulsation dampener can be used to smooth out the fluid flow by absorbing such pulsations and providing extra pressure when needed.

SUMMARY

The disclosure herein provides various embodiments of fluid pulsation dampeners, including embodiments that have features enabling them to effectively dampen pulsations in fluid piping systems that are subject to high fluid pressures. For example, some embodiments comprise an expandable polytetrafluoroethylene (PTFE) bellows that defines a pressurized gas chamber on an exterior thereof and a liquid chamber in fluid communication with the piping system on the interior thereof. The interior of the bellows can include a rigid bellows support member that helps to support the bellows in a compressed position when there is a high pressure differential between the gas chamber and the liquid chamber. Such a high pressure differential may be experienced, for example, when the gas chamber is charged to a relatively high pressure, but there is little pressure in the liquid chamber to counteract the pressure in the gas chamber.

In a fluid piping system intended to operate with high pressure fluid, the gas chamber may need to be pressurized to a relatively high pressure in order to effectively dampen pulsations. In view of such a high pressure in the gas chamber, however, when the liquid chamber is significantly less pressurized than the gas chamber, the high pressure differential could cause the expandable bellows to collapse in on itself and suffer permanent damage. The bellows support member desirably solves this problem by providing both radial and longitudinal support to the expandable bellows in the compressed configuration, to resist further compression or collapsing of the bellows in on itself.

According to some embodiments, a pulsation dampener comprises: a housing extending longitudinally from a first end to a second end, the housing having a longitudinally extending internal cavity; a cap attached to the first end of the housing, the cap having a proximal end and a distal end; an expandable polytetrafluoroethylene (PTFE) bellows positioned within the internal cavity of the housing, the expandable bellows comprising a proximal end attached to the distal end of the cap, a distal end that is movable within the internal cavity along the longitudinal direction, and an expansion portion comprising a plurality of pleats between the proximal and distal ends of the bellows; a bellows support member coupled to an interior side of the distal end of the expandable bellows and extending longitudinally away from the distal end of the expandable bellows toward the proximal end of the expandable bellows, the bellows support member comprising a rigid material having a tapered shape extending longitudinally adjacent the pleats of the bellows, wherein the bellows support member is sized such that, in a compressed configuration with the bellows support member in contact with the cap, opposing surfaces of adjacent pleats of the expandable bellows are forced into contact with one another, wherein a proximal end of the bellows support member comprises a tapered shape configured to engage and be laterally centered by a complementary tapered shape in the distal end of the cap when the expandable bellows is in the compressed configuration, and wherein the bellows support member is sized such that it fills at least 50% of a volume radially inward of the expandable portion of the bellows in the compressed configuration; a variable volume gas chamber defined by at least the internal cavity of the housing and an exterior surface of the expandable bellows; a gas valve in fluid communication with the variable volume gas chamber for introduction of gas into the variable volume gas chamber; and a variable volume liquid chamber defined at least by the cap, the bellows support member, and an interior surface of the expandable bellows.

In some embodiments, the interior side of the distal end of the expandable bellows comprises a cavity and a radially inward extending protrusion, and a distal end of the bellows support member comprises a protruding member shaped to fit at least partially within the cavity of the distal end of the expandable bellows and to be retained by the radially inward extending protrusion in a snap-fit arrangement. In some embodiments, a radially inner surface of the plurality of pleats defines an inner diameter of the expandable bellows, and wherein, with the expandable bellows in a relaxed configuration, a total diametral clearance between the inner diameter of the expandable bellows and the tapered shape of the bellows support member extending longitudinally adjacent the pleats is no greater than 15% of the inner diameter of the expandable bellows. In some embodiments, the bellows support member is sized such that it fills at least 75% of the volume radially inward of the expandable portion of the bellows in the compressed configuration. In some embodiments, the pulsation dampener is capable of withstanding a situation in which the gas chamber has a pressure that is at least 10,000 psi greater than the pressure in the liquid chamber without permanent deformation to the expandable bellows.

According to some embodiments, a pulsation dampener comprises: a housing extending longitudinally from a first end to a second end, the housing having a longitudinally extending internal cavity; a cap attached to the first end of the housing, the cap having a proximal end and a distal end; an expandable polytetrafluoroethylene (PTFE) bellows positioned within the internal cavity of the housing, the expandable bellows comprising a proximal end attached to the distal end of the cap, and a distal end that is movable within the internal cavity along the longitudinal direction; a bellows support member coupled to an interior side of the distal end of the expandable bellows and extending longitudinally away from the distal end of the expandable bellows toward the proximal end of the expandable bellows; a variable volume gas chamber defined by at least the internal cavity of the housing and an exterior surface of the expandable bellows; a gas valve in fluid communication with the variable volume gas chamber for introduction of gas into the variable volume gas chamber; and a variable volume liquid chamber defined at least by the cap, the bellows support member, and an interior surface of the expandable bellows.

In some embodiments, the bellows support member comprises a rigid material. In some embodiments, the interior side of the distal end of the expandable bellows comprises a cavity and a radially inward extending protrusion, and a distal end of the bellows support member comprises a protruding member shaped to fit at least partially within the cavity of the distal end of the expandable bellows and to be retained by the radially inward extending protrusion. In some embodiments, the expandable bellows comprises an expandable portion between the proximal and distal ends of the expandable bellows, wherein the expandable portion comprises a plurality of pleats, and a radially inner surface of the plurality of pleats defines an inner diameter of the expandable bellows, wherein the bellows support member comprises an attachment portion at a distal end of the bellows support member, an axial support portion at a proximal end of the bellows support member, and a radial support portion between the attachment portion and the axial support portion, and wherein, with the expandable bellows in a relaxed configuration, a total diametral clearance between the inner diameter of the expandable bellows and the radial support portion of the bellows support member is no greater than 15% of the inner diameter of the expandable bellows. In some embodiments, a proximal end of the bellows support member comprises a tapered shape configured to engage a complementary tapered shape in the proximal end of the cap when the expandable bellows is in a compressed configuration. In some embodiments, the bellows support member is sized such that, in a compressed configuration with the bellows support member in contact with the cap, opposing surfaces of adjacent pleats of the expandable bellows are forced into contact with one another. In some embodiments, the pulsation dampener is capable of withstanding a situation in which the gas chamber has a pressure that is at least 10,000 psi greater than the pressure in the liquid chamber without permanent deformation to the expandable bellows.

According to some embodiments, a pulsation dampener comprises: a housing having in internal cavity; an expandable bellows positioned within the internal cavity of the housing, the expandable bellows comprising a proximal end, a distal end, and an expandable portion between the proximal and distal ends, wherein the proximal end of the expandable bellows is fixed with respect to the housing, and the distal end of the expandable bellows is movable within the internal cavity with respect to the housing; a bellows support member coupled to an interior side of the distal end of the expandable bellows and extending longitudinally away from the distal end of the expandable bellows toward the proximal end of the expandable bellows; a cap fixed with respect to the housing and positioned to support the bellows support member when the expandable bellows is in a longitudinally compressed configuration; a first variable volume chamber defined by at least the internal cavity of the housing and an exterior surface of the expandable bellows; and a second variable volume chamber defined by at least the cap, the bellows support member, and an interior surface of the expandable bellows.

In some embodiments, the housing comprises a gas port in fluid communication with a gas valve for introduction of a gas into the first variable volume chamber, and the cap comprises a fluid port for introduction of a liquid into the second variable volume chamber. In some embodiments, the expandable portion of the expandable bellows comprises a plurality of pleats, and a radially inner surface of the plurality of pleats defines an inner diameter of the expandable bellows, wherein the bellows support member comprises an attachment portion at a distal end of the bellows support member, an axial support portion at a proximal end of the bellows support member, and a radial support portion between the attachment portion and the axial support portion, and wherein, with the expandable bellows in a relaxed configuration, a total diametral clearance between the inner diameter of the expandable bellows and the radial support portion of the bellows support member is no greater than 15% of the inner diameter of the expandable bellows. In some embodiments, the expandable bellows comprises a polymer, and the bellows support member comprises a material having a higher stiffness than the polymer of the expandable bellows. In some embodiments, the expandable bellows comprises polytetrafluoroethylene (PTFE) and the bellows support member comprises metal.

According to some embodiments, a bellows assembly for a fluid pulsation dampener comprises: an expandable bellows having a proximal end, a distal end, and a longitudinally expandable portion extending between the proximal and distal ends; and a bellows support member coupled to an interior side of the distal end of the expandable bellows and extending longitudinally away from the distal end of the expandable bellows toward the proximal end of the expandable bellows, wherein the proximal end of the expandable bellows comprises an opening into a variable volume chamber defined by at least the distal end of the expandable bellows, the longitudinally expandable portion of the expandable bellows, and the bellows support member.

In some embodiments, the longitudinally expandable portion of the expandable bellows comprises a plurality of pleats. In some embodiments, a radially inner surface of the plurality of pleats defines an inner diameter of the expandable bellows, wherein the bellows support member comprises an attachment portion at a distal end of the bellows support member, an axial support portion at a proximal end of the bellows support member, and a radial support portion between the attachment portion and the axial support portion, and wherein, with the expandable bellows in a relaxed configuration, a total diametral clearance between the inner diameter of the expandable bellows and the radial support portion of the bellows support member is no greater than 15% of the inner diameter of the expandable bellows. In some embodiments, at least the longitudinally expandable portion of the expandable bellows comprises polytetrafluoroethylene (PTFE). In some embodiments, the proximal end, distal end, and longitudinally expandable portion of the expandable bellows comprise PTFE. In some embodiments, the expandable bellows comprises a polymer, and the bellows support member comprises a material having a higher stiffness than the polymer of the expandable bellows. In some embodiments, the expandable bellows comprises polytetrafluoroethylene (PTFE) and the bellows support member comprises metal. In some embodiments, the proximal end of the expandable bellows comprises a flange extending proximally, the flange comprising a larger diameter at a proximal end of the flange than at a distal end of the flange. In some embodiments, the flange comprises one or more annular grooves configured to accommodate an O-ring seal.

For purposes of this summary, certain aspects, advantages, and novel features of the inventions are described herein. It is to be understood that not necessarily all such advantages may be achieved in accordance with any particular embodiment of the inventions. Thus, for example, those skilled in the art will recognize that the inventions may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present disclosure are described in detail below with reference to the drawings of various embodiments, which are intended to illustrate and not to limit the disclosure. The features of some embodiments of the present disclosure, which are believed to be novel, will be more fully disclosed in the following detailed description. The following detailed description may best be understood by reference to the accompanying drawings wherein the same numbers in different drawings represents the same parts. All drawings are schematic and are not intended to show any dimension to scale. The drawings comprise the following figures in which.

DETAILED DESCRIPTION

Figure 1B:
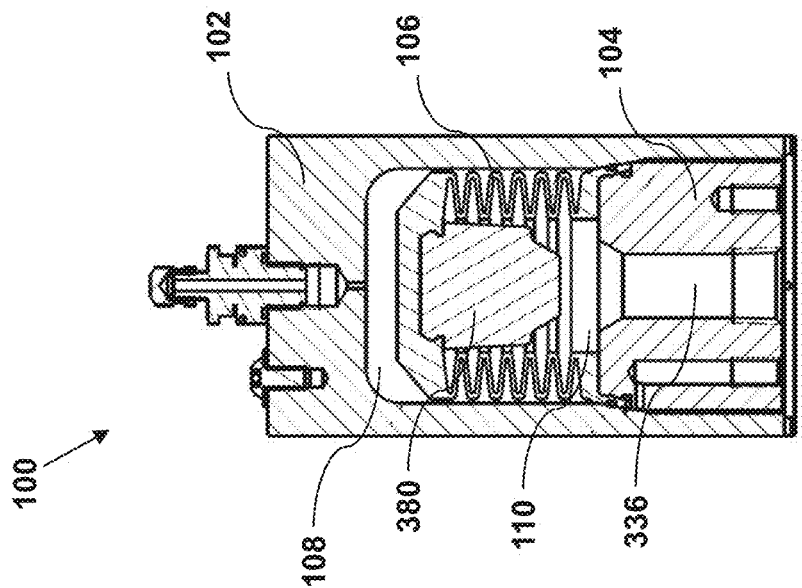
FIG. 1B is a cross-sectional view of the pulsation dampener of FIG. 1A.

Although several embodiments, examples, and illustrations are disclosed below, it will be understood by those of ordinary skill in the art that the inventions described herein extend beyond the specifically disclosed embodiments, examples, and illustrations and include other uses of the inventions and obvious modifications and equivalents thereof. Embodiments of the inventions are described with reference to the accompanying figures, wherein like numerals refer to like elements throughout. These drawings are considered to be a part of the entire description of some embodiments of the inventions. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Fluid piping systems are used in various industries to transfer liquid such as water, gas, oil, chemicals, and/or the like. A pump is often used to transmit such fluid from an upstream portion of the piping system to a downstream portion. Pumps invariably introduce pulsations, vibrations, and/or other unwanted effects into the system, however, which can wear out system components over time and cause failure of system components, among other potential issues. One way to reduce or eliminate such pulsations, vibrations, and/or the like is to install a pulsation dampener, preferably near the pump on the downstream side. One type of pulsation dampener includes a sealed pressurized gas chamber and a liquid chamber, with a deformable bladder or other deformable member separating the two chambers. The fluid piping system is in fluid communication with the liquid chamber and, as pressure spikes are introduced into the liquid chamber by pulsations from the pump, those pressure spikes can be reduced and/or eliminated by deforming the bladder or other deformable member toward the pressurized gas chamber. Further, as the pressure output from the pump dips between the spikes, the bladder or other deformable member can deform toward the liquid chamber, adding pressure to the downstream flow. Such a pulsation dampener can desirably smooth out the downstream flow by reducing or eliminating the peaks and valleys in pressure output from the pump.

Such a fluid pulsation dampener design can work relatively effectively. Certain challenges arise, however, when attempting to design such a pulsation dampener in high-pressure situations. In general, the gas chamber of a fluid pulsation dampener should be tuned to the pressure expected in the liquid chamber, and it can be desirable to set the gas chamber pressure to be approximately 80% of the expected fluid pressure. Accordingly, the higher the pressure that is expected in the liquid chamber, the higher the pressure that the gas chamber should be charged to. In some cases, it can be desirable to charge the gas chamber to somewhere within a range of about 2,000 to 15,000 psi. In certain applications, such as some applications in the oil and gas industry, it may be desirable to pressurize the gas chamber of a pulsation dampener toward the higher end, such as up to 10,000 to 15,000 psi or greater. When a similar level of pressure is present in the liquid chamber, such high pressure may not be a significant issue, because the two pressures desirably balance each other out. Issues can arise, however, when the pressure in the liquid chamber is significantly reduced, such as in a situation where the fluid pump is turned off for maintenance or other reasons. In such a case, the gas chamber of the pulsation dampener may be charged to 10,000 to 15,000 psi or higher, with no counterbalancing fluid pressure in the liquid chamber. Such a high pressure differential may cause the deformable member to deform beyond its yield point, causing permanent damage and/or plastic deformation to the deformable member.

A deformable member or bladder that separates a gas chamber from a liquid chamber in a pulsation dampener may utilize various materials. For example, one embodiment of a pulsation dampener may utilize rubber for the deformable member. Such a deformable member may have a relatively high yield point/elastic limit and, depending on the structural design of the deformable member and other portions of the pulsation dampener, may be able to withstand the types of pressure differentials that could occur when the gas chamber is pressurized to 10,000 to 15,000 psi or more and there is no counterbalancing pressure in the liquid chamber. For example, if the rubber deformable member encloses the gas chamber, and there is a high pressure differential, then the rubber deformable member may simply expand/blow up like a balloon, without causing permanent damage. In some cases, however, it may be desirable to use different materials for the deformable member that have a lower yield point than rubber and can be significantly damaged by such a pressure differential. For example, one material that may be desirable to use as a deformable member in a pulsation dampener is polytetrafluoroethylene (PTFE). PTFE can be desirable, for example, because it is a relatively flexible or elastically deformable material that is also relatively inert, nontoxic, and nonflammable. PTFE is also relatively resistant to damage by harsh chemicals that may be present in the fluid piping system. In general, however, a material like PTFE cannot withstand as much deformation or strain as rubber without suffering permanent damage or plastic deformation.

The embodiments disclosed herein present various solutions to these problems. For example, some embodiments comprise a PTFE expandable bellows that incorporates an internal support structure. Such an expandable bellows may be configured to be positioned within a cavity of a housing, with a proximal end of the bellows fixed with respect to the housing and a distal end of the bellows movable along a longitudinal direction with respect to the housing. The distal end of the bellows may include a supporting component that is attached to an internal side of the distal end and moves in the longitudinal direction along with the distal end of the bellows.

The expandable bellows may have an expanded position and a compressed position. For example, the expanded position may correspond to the distal end of the bellows extending longitudinally to the end of the internal cavity of the housing, and the compressed position may correspond to the distal end of the bellows retracting toward the proximal end of the bellows until the internal support member contacts a cap or other structure that stops it from moving. It should be noted that, although the expanded position is described as corresponding to the distal end of the bellows contacting a distal end of the internal cavity of the housing, in practice the bellows might never reach such a position if the pressure in the gas chamber is sufficiently high as compared to the pressure in the liquid chamber.

In some embodiments, the internal support structure is configured to prevent the expandable bellows from collapsing in on itself (or at least from collapsing in on itself to a point where plastic deformation would occur) when the expandable bellows is in the compressed or collapsed position and a relatively high pressure in the gas chamber would otherwise tend to cause the bellows to be damaged. For example, the internal support structure may take the form of a generally cylindrical and/or tapered structure that, due to its attachment to the internal side of the distal end of the bellows will stop the distal end of the bellows from compressing further in the longitudinal direction when the internal support structure is mechanically stopped by the cap or other component of the pulsation dampener. Further, the internal support structure may desirably have a radial outer wall that is positioned relatively close to an innermost wall of the expandable bellows, thus limiting radial inward collapse of the expandable bellows in the collapsed position. In some embodiments, the internal support structure is referred to as a bellows support member.

Another potential problem with some pulsation dampener designs, particularly some appendage style pulsation dampeners, is that some liquid may tend to be trapped inside the liquid chamber even when the liquid chamber is in its smallest volume configuration (for example, corresponding to the compressed configuration of the expandable bellows disclosed herein). For example, some pulsation dampeners may be designed such that, when the liquid chamber is in its smallest volume configuration, the liquid chamber (or at least some portion of it) is sealed off from the fluid piping system. In some embodiments, the pulsation dampeners disclosed herein are configured to allow all or a majority of the fluid in the liquid chamber to remain in fluid communication with the fluid piping system even when the expandable bellows is in the fully compressed configuration. Stated another way, in some embodiments disclosed herein, the liquid chamber is not sealed off from the fluid piping system when the expandable bellows is in the fully compressed position. For example, as further discussed below, the bellows support member may be configured such that it is guided and supported by the cap of the housing (or another component fixed with respect to the housing) in the compressed configuration, without a fluid tight seal being created between the bellows support member and the cap. This can be beneficial over alternative designs that may cause at least a portion of the liquid chamber to be fluidically sealed off from the fluid piping system when the liquid chamber is in its smallest volume configuration.

Some of the various beneficial features of embodiments discussed below include: a bellows support member that supports a bellows in a collapsed position in both longitudinal and radial directions, a bellows support member having a proximal end that is shaped to be received by a corresponding shape in a cap that helps to center or otherwise position the bellows support member with respect to the cap, and a bellows support member that is configured to avoid trapping liquid the liquid chamber in the collapsed position.

Pulsation Dampening in Fluid Piping Systems

Figure 1A:
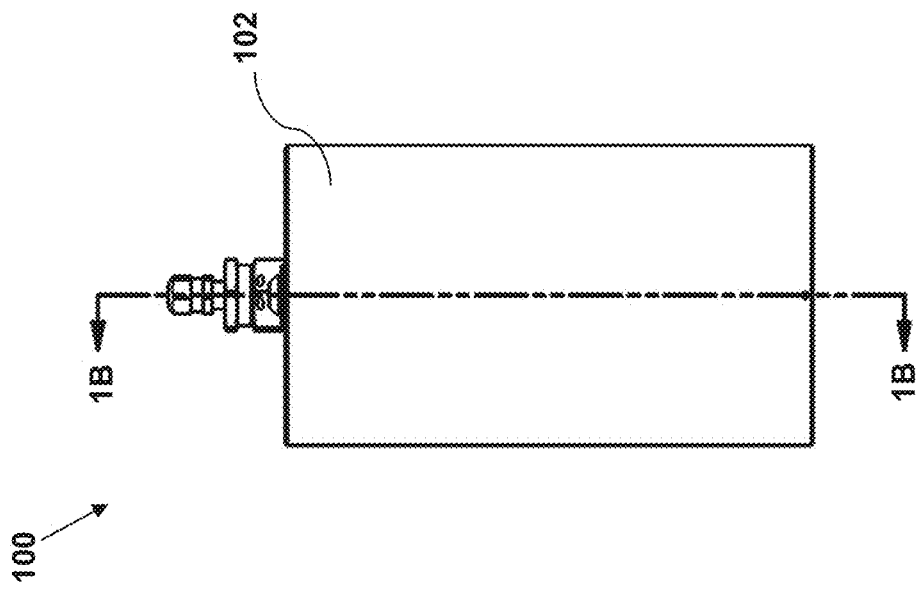
FIG. 1A is a side view of an embodiment of a pulsation dampener.
Figure 2:
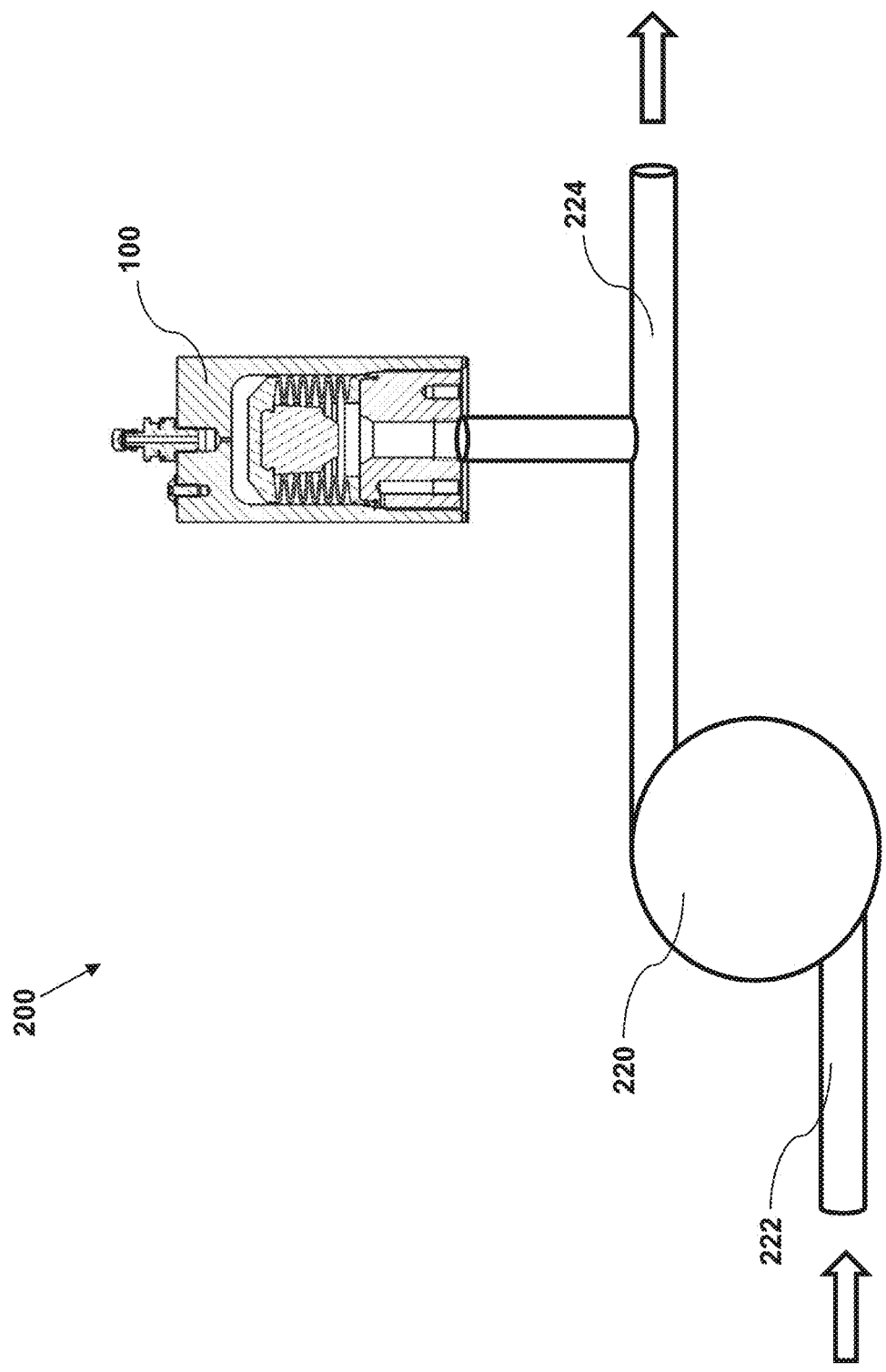
FIG. 2 is a schematic diagram of an embodiment of a fluid piping system that comprises the pulsation dampener of FIG. 1A.

Turning to the figures, FIGS. 1A and 1B illustrate one embodiment of a fluid pulsation dampener 100. FIG. 1A illustrates a side view of the pulsation dampener 100, and FIG. 1B illustrates a cross-sectional view. The pulsation dampener 100 is generally cylindrical in shape, although other shapes may also be used. FIG. 2 illustrates a schematic diagram of the pulsation dampener 100 in use in an appendage type configuration in a fluid piping system 200. The fluid piping system 200 comprises a pump 220 that is in fluid communication with upstream piping 222 and downstream piping 224. The pulsation dampener 100 is connected in fluid communication with the downstream piping 224 in order to reduce and/or eliminate pulsations, vibrations, and/or the like in the fluid flow output from the pump 220. The pulsation dampener 100 may be used in fluid piping systems having various types of pumps 220, such as centrifugal, metering, hose, or air operated double diaphragm pumps.

The pulsation dampener 100 of FIG. 1B includes a housing 102 that defines an internal cavity having an expandable bellows 106 and a cap 104 position therein. The expandable bellows 106 is movable within the cavity of the housing 102 and defines a volume of a variable volume gas chamber 108 on an outside of the expandable bellows 106, and of a variable volume liquid chamber 110 on an interior side of the expandable bellows 106. Further, as discussed in greater detail below, the expandable bellows 106 has a bellows support member 380 coupled to an interior side of the distal end of the expandable bellows 106. In this version of a pulsation dampener 100, the gas chamber is positioned at the top, and the liquid chamber 110 is positioned at the bottom, however, other embodiments may position the chambers differently.

In the fluid piping system 200 of FIG. 2, the pulsation dampener 100 is connected in an appendage configuration. This means that the pulsation dampener 100 is connected in parallel with the output of the pump 220, using a single liquid inlet/outlet port through which fluid can enter and exit the liquid chamber 110 of the pulsation dampener 100. The concepts disclosed herein are not limited to such arrangements, however, and could be used with a pulsation dampener having separate liquid inlet and outlet ports that may be, for example, connected in series with the output of the pump 220 instead of in parallel.

Example High Pressure Fluid Pulsation Dampener

Figure 3:
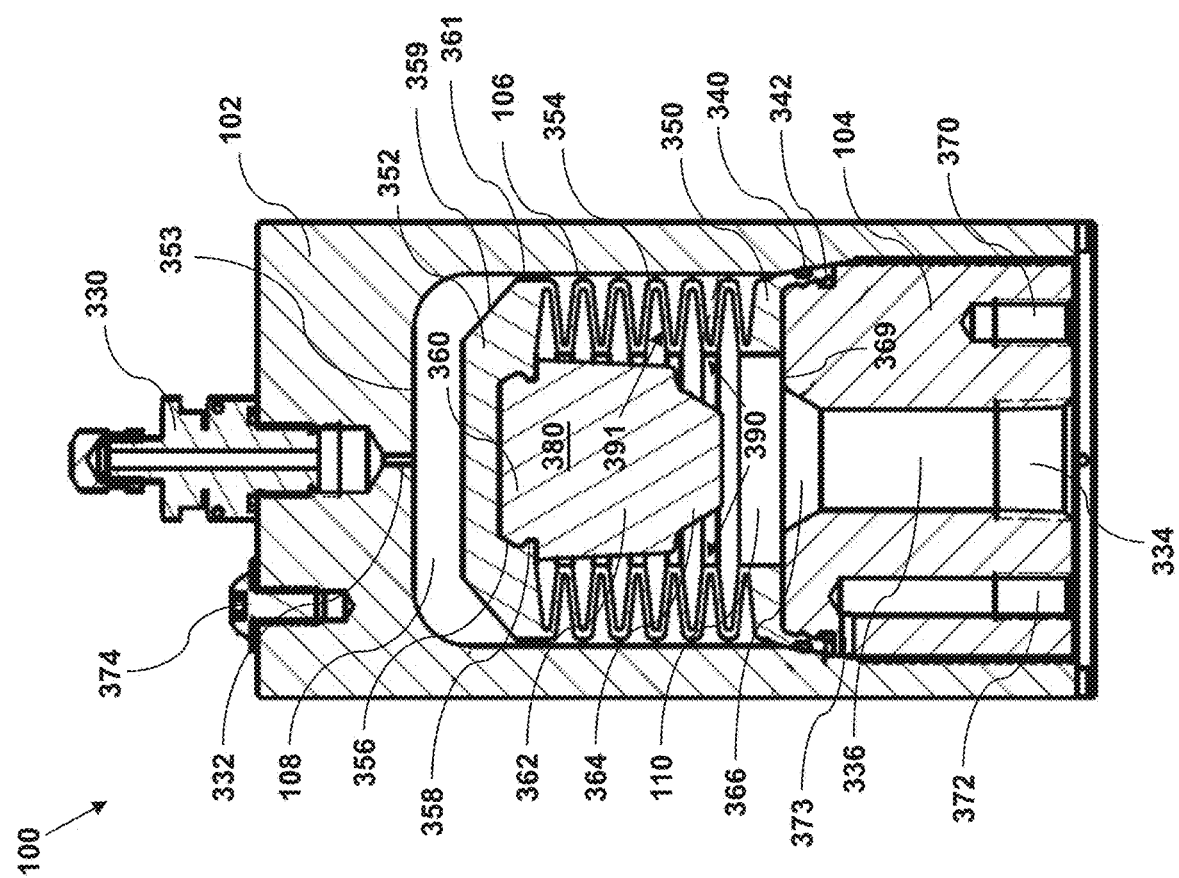
FIG. 3 is an enlarged cross-sectional view of the pulsation dampener of FIG. 1A.
Figure 4:
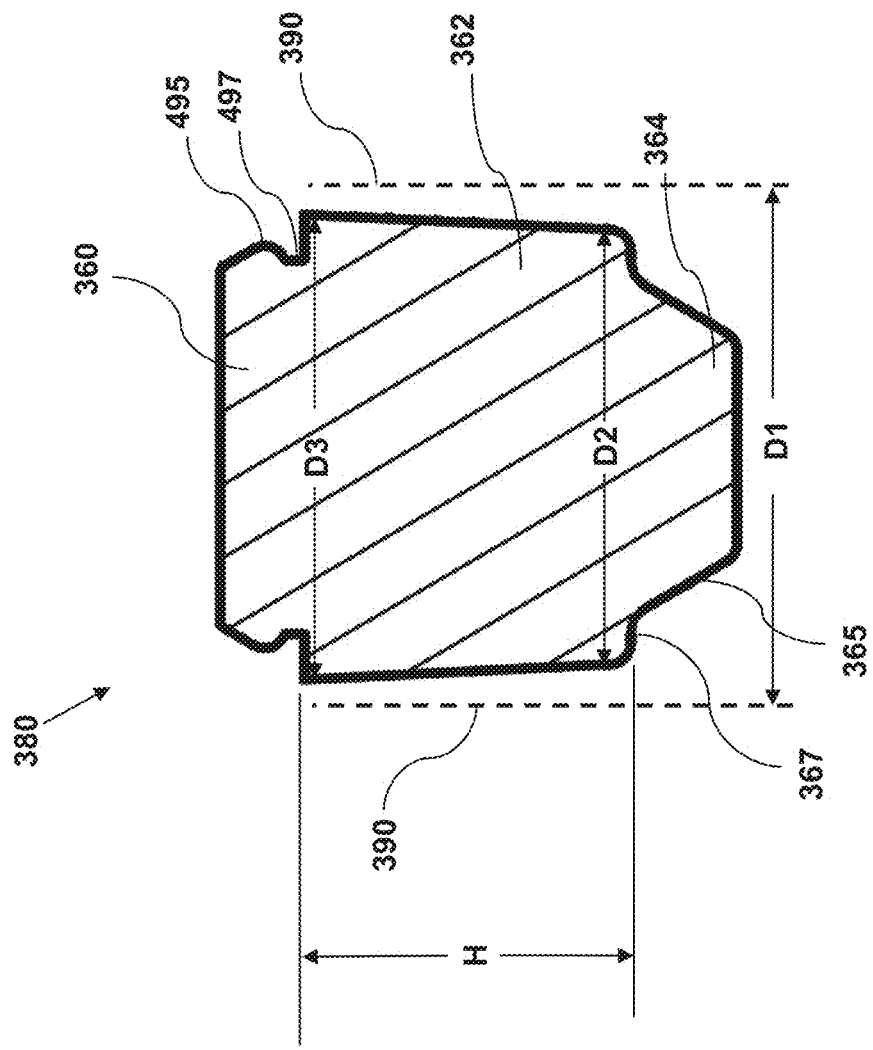
FIG. 4 is a cross-sectional view of a bellows support member of the pulsation dampener of FIG. 1A.

FIGS. 3 and 4 illustrate additional details of the pulsation dampener 100 of FIGS. 1A and 1B. FIG. 3 shows an enlarged version of the cross-sectional view of FIG. 1B, and FIG. 4 shows an enlarged cross-sectional view of only the bellows support member 380 of the pulsation dampener 100.

With reference to FIG. 3, the pulsation dampener 100 comprises a housing 102 defining an internal cavity into which the expandable bellows 106 and cap 104 are inserted. The cap 104 is desirably fixed with respect to the housing 102 at a proximal end of the housing 102. The cap 104 further comprises a fluid port or fluid passage 336 that allows a fluid piping system attached to piping attachment portion 334 to be in fluid communication with the liquid chamber 110. The piping attachment portion 334 may, for example, comprise a threaded hole for coupling to a pipe, a connector, and/or the like.

The expandable bellows 106 comprises a proximal end 350, a distal end 352, and an expandable portion 354 positioned between the proximal and distal ends 350, 352. The expandable bellows 106 is desirably generally cylindrical in shape (e.g., the shape that would be formed if the cross-sectional shape of the bellows 106 shown in FIG. 3 were rotated about the longitudinal axis of the bellows 106). Such a shape can be desirable, for example, to help resist damage when experiencing a relatively high pressure differential between the gas and liquid chambers 108, 110. Other shapes may be used, however.

Desirably, the proximal end 350 of the bellows 106 is captured between the distal end of the cap 104 and an internal surface of the housing 102, thus fixing the proximal end 350 of the expandable bellows 106 with respect to the housing 102 and cap 104. Other techniques for fixing the proximal end 350 may be used, however. In some embodiments, the proximal end 350 of the expandable bellows 106, the cap 104, and/or the housing 102 comprises one or more grooves to accommodate gaskets, such as O-rings 340 and 342, to help create a fluid and gas tight seal between the cap 104, bellows 106, and housing 102.

The expandable portion 354 of the expandable bellows 106 desirably comprises a plurality of folds that enables the distal end 352 of the bellows 106 to move longitudinally within the internal cavity of the housing 102 without plastic deformation to the bellows 106. The folds may also be referred to as pleats or corrugations. In some embodiments, the expandable bellows 106, or at least the expandable portion 354 of the expandable bellows 106, is formed from polytetrafluoroethylene (PTFE). PTFE can be a desirable material to use, for example, because it is inert, nontoxic, and resistant to degradation by contact with harsh chemicals or liquids in the liquid chamber 110. Desirably, the expandable portion 354 is shaped using a configuration of folds that will allow the distal end 352 to move longitudinally back and forth between a fully compressed configuration (e.g., with the bellows support member 380 in contact with the cap 104) and a fully expanded configuration (e.g., with the distal end 352 of the bellows 106 in contact with the distal wall 353 of the internal cavity of the housing 102) without causing permanent deformation to the expandable portion 354. Some embodiments may not necessarily design the bellows 106 to be extendable all the way to the distal wall 353, since a properly setup fluid piping system may never require the bellows 106 to extend all the way to the distal wall 353. It can be desirable to design the bellows 106 to extend all the way to the distal wall 353 without damage, however, at least to protect the bellows 106 from damage if, for example, the gas chamber 108 is not tuned properly to the application (e.g., if it is undercharged or not pressurized at all). In some embodiments, the bellows 106 (or at least the expandable portion 354) is produced by machining from a solid block of PTFE. For example, the bellows 106 of FIG. 3 may be machined in essentially the form it is shown in in FIG. 3, and that may correspond to the relaxed configuration of the bellows 106. Other embodiments may use other manufacturing methods.

With continued reference to FIG. 3, the pulsation dampener 100 further comprises a bellows support member 380 positioned inside the expandable bellows 106 and desirably coupled to the inside of the distal end 352 of the expandable bellows 106. The bellows support member 380 comprises an attachment portion 360 at its distal end, an axial support portion 364 at its proximal end, and a radial support portion 362 between the attachment portion 360 and axial support portion 364. The attachment portion 360 is coupled to the distal end 352 of the expandable bellows 106 such that the bellows support member 380 will move longitudinally within the pulsation dampener along with the distal end 352 of the bellows 106 as the pressure within the liquid chamber 110 changes relative to the pressure within the gas chamber 108.

In this embodiment, the bellows support member 380 is coupled to the distal end 352 of the bellows 106 by inserting attachment portion 360 into a cavity 356 within the internal side of the distal end 352 of the bellows 106. Desirably, the cavity 356 comprises one or more radial inwardly extending protrusions 358 that fit into a corresponding radially inward extending portion 497 of the bellows support member 380 (see FIG. 4). Similarly, the bellows support member 380 comprises a radially outward extending protruding member 495 that desirably fits into a radially outward extending portion of the cavity 356 positioned above the radially inward extending protrusion 358. Accordingly, the attachment portion 360 of the bellows support member 380 is desirably captured and retained by the cavity 356 of the bellows 106. In some embodiments, these features form a snap-fit between the bellows support member 380 and the bellows 106. In some embodiments, these features are reversed, meaning that the distal end of the bellows comprises a protrusion that snap-fits into a cavity of the bellows support member 380. It should be noted that the shapes of the distal end 352 of the bellows 106 and the attachment portion 360 of the bellows support member 380 shown in FIG. 3 are desirably symmetrical about their longitudinal axes.

Other ways of attaching or coupling the bellows support member 380 to the distal end 352 of the bellows 106 may also be utilized. For example, other embodiments may use fasteners, insert molding, a threaded connection, and/or the like. The configuration shown in FIGS. 3 and 4 may be desirable, however, at least because the tapered profile of the radially outward protruding portion 495 can ease the assembly of the bellows support member 380 into the cavity 356, and the radially inward extending protrusion 358 can help to maintain the connection once made. Further, the bellows 106 is desirably shaped such that a higher pressure in the gas chamber 108 than in the liquid chamber 110 will tend to cause the bellows 106 to more tightly grip or maintain its hold on the bellows support member 380. For example, the distal-facing surface of the distal end 352 of the bellows 106 comprises an angled, chamfered, or contoured portion 359 that, along with the radial outer surface 361 of the bellows 106 can help to cause of the radially inward extending protrusion 358 to be biased radially inwardly by a positive pressure differential between the gas chamber 108 and liquid chamber 110. Further, the radially outermost surface 361 of the bellows 106 (or at least the radially outermost surface 361 of the distal end 352 of the bellows 106) can be sized to have relatively little clearance from the interior wall of the inner cavity of the housing 102. This can, for example, help to avoid the radial inward protrusion 358 expanding outwardly and releasing the bellows support member 380 in response to a significantly positive pressure differential in the liquid chamber 110 with respect to the gas chamber 108. For example, the radially outermost surface 361 of the distal end 352 of the bellows 106 may have a total diametral clearance from the inner wall of the cavity in the housing 102 of no more than 0.05, 0.10, 0.15, or 0.20 inches.

Although in this embodiment there is desirably a single radial inward protrusion 358 that is annular in shape, other embodiments may comprise more than one radial inward protrusion 358 that are each annular in shape and/or may not be annular in shape. It can be desirable for the radial inward protrusion 358 to be annular in shape, however, at least because the hoop stress in such a ring-shaped or annular shaped protrusion can further help to keep the bellows support member 380 attached to the distal end 352 even when there is a significant positive pressure differential in the liquid chamber 110 versus the gas chamber 108. Also, it should be noted that, in general, there will typically be a higher pressure in the gas chamber 108 than the liquid chamber 110. There may be some situations, however, where there is a significantly higher pressure in the liquid chamber 110 than the gas chamber 108, such as in the case of an extreme pressure spike in the fluid piping system and/or if the gas chamber 108 is not properly tuned to the application. In such situations, it would be desirable to still maintain the bellows support member 380 in engagement with the distal end 352, because otherwise, permanent damage to the assembly could occur and/or the assembly may need to be disassembled and repaired.

With continued reference to FIGS. 3 and 4, the bellows support member 380 comprises a radial or lateral support portion 362 and an axial or longitudinal support portion 364. The axial or longitudinal support portion 364 is shaped and configured to nest into support portion 366 of the cap 104 when the bellows 106 is in the fully collapsed configuration. For example, when there is little or no pressure in the liquid chamber 110 as compared to the gas chamber 108, the bellows 106 will desirably be in the fully collapsed configuration. In that configuration, the bellows support member 380 is desirably resisted from moving any further longitudinally in the proximal direction (toward the piping attachment 334) by the axial or longitudinal support portion 364 engaging the support portion 366 of the cap 104. In some embodiments, such as the embodiment shown in FIGS. 3 and 4, the support portions 364 and 366 each comprise a tapered shape. These complementary tapered shapes can help to ensure that the bellows support portion 380 is radially or laterally centered in the assembly when in the fully compressed configuration. This can help, for example, to prevent damage to the bellows 106 that could otherwise occur if the bellows 106 were caused to be dislocated off-center and pressed into the interior wall of the housing 102. This can also help, for example, to ensure that the expandable portion 354 of the bellows 106 is in a centered arrangement that can best help the expandable portion 354 to avoid damage or permanent deformation in response to a high pressure differential between the gas chamber 108 and liquid chamber 110.

In various embodiments, either or both of the tapered surface 365 and radially extending flat surface 367 of the axial support portion 364 can be configured to engage the support portion 366 and/or a flat distal face 369 of the cap 104 when the bellows 106 is in the fully compressed position. In some cases, however, it can be desirable for only the tapered surface 365 to engage the support portion 366 in order to ensure that the bellows support member 380 is centered with respect to the cap 104.

In some embodiments, the attachment portion 360 of the bellows support member 380 also helps to resist damage to the bellows 106 in the compressed configuration. For example, the attachment portion 360 comprises a flat distal end (although other shapes may be used) that supports the "roof" of the bellows 106 (e.g., the center area of the distal end 352) when in the compressed configuration. If the bellows support member 380 were, for example, tubular shaped instead of having a solid distal end, it could be possible for the roof of the bellows 106 to be deformed into the inside of the bellows support member 380 in the compressed configuration, thus damaging the distal end 352 of the bellows. This is also one of the reasons why attaching the bellows support member 380 to the distal/movable end of the bellows may be more desirable than having a stationary bellows support member positioned at the proximal end of the bellows. If the bellows support member were stationary at the proximal end of the bellows, then the bellows support member may need to have one or more fluid passages therethrough, which would also be areas that the bellows could be deformed into when compressed under a high pressure differential.

It should be noted that desirably the bellows support member 380 and cap 104 are made from metal or another relatively rigid material, and desirably there is no elastomer seal between the bellows support member 380 and cap 104. Accordingly, even when the axial support portion 364 engages the support portion 366 of the cap 104, a fluid tight seal between the bellows support member 380 and cap 104 may not be formed. This can be a desirable feature, because it can allow most if not all of any liquid that is remaining within the interior portion of the bellows 106 to still be evacuated from the bellows 106 when the bellows 106 is in the fully contracted or compressed position (or at least to remain in fluid communication with the piping system when the bellows 106 is in the fully contracted or compressed position). This can be beneficial, for example, because it can help to prevent trapping fluid within the bellows for extended periods of time. Although such a feature can be beneficial, embodiments disclosed herein are not required to have such a feature, and in some cases, a fluid tight seal may be formed between the bellows support member 380 and the cap 104 in the compressed configuration, with or without an elastomer seal. Further, as described below, some embodiments are configured such that, when the bellows 106 is in the fully contracted or compressed position, the pleats of the bellows are compressed together, thus leaving little or no room for fluid between adjacent pleats. In such an embodiment, most if not all of the liquid within the bellows will have already been squeezed out of the bellows when the bellows support member 380 contacts the cap 104.

Another feature of the embodiment of FIG. 3 that can help to limit the amount of liquid trapped inside of the liquid chamber 110 is that the bellows support member 380 desirably takes up a significant amount of the internal volume of the bellows 106 in the compressed configuration. For example, the bellows support member 380 may be designed to fill at least 40%, 50%, 60%, 70%, 75%, 80%, 90%, or more of the internal volume of the expansion portion 354 of the bellows 106 when the bellows 106 is in the fully compressed position. Stated another, way, if the bellows 106 is in the fully compressed position, a volume can be defined by the air space captured by the internal side of the pleats of the expansion portion 354, longitudinally between the proximal and distal ends of the expansion portion 354. The bellows support member 380 may be seized to fill at least 40%, 50%, 60%, 70%, 75%, 80%, 90%, or more of that volume. In use, the gas chamber 108 is the portion of the pulsation dampener 100 that is generally providing the pulsation dampening, and thus the liquid chamber 110 does not necessarily have to have a large volume available for liquid.

Additional features of the pulsation dampener 100 shown in FIG. 3 include a gas valve 330, threaded holes 370 and 372, and a bolt 374. The gas valve 330 is connected to the housing 102 and is desirably in fluid communication with the gas chamber 108 through one or more ports or fluid passages 332. In this embodiment, the gas valve 330 is desirably a one-way valve, such as a Schrader type valve, but other valves may also be used. In a typical usage, the gas valve 330 is utilized to tune the pressure of the gas chamber 108 to a particular application, and then is not utilized again unless the pressure in the gas chamber 108 needs to be changed due to changes in the application. The gas chamber 108 may be charged through the gas valve 330 with nitrogen, air, or other compressible gases.

The threaded holes 370, 372 may be used for bolts that are used to attach the pulsation dampener 100 to a fluid piping system. In some embodiments, one or more of the threaded holes 370, 372 (in this case only threaded hole 372) may include a safety feature 373. In this embodiment, the safety feature 373 is a lateral hole that fluidly connects the bore of the threaded hole 372 to a portion of the internal cavity of the housing 102. This feature may, for example, ensure that there cannot be a fluid pressure within the threaded juncture between the cap 104 and the housing 102. Although only two threaded holes 370, 372 are shown in this cross-sectional view, additional threaded holes may be present in the cap 104.

Bolt 374 may, for example, function as a tie wire bolt. For example, the bolt 374 may function as an anchor for a tie wire that passes between bolt 374 and gas valve 330 as an additional safety feature to ensure gas valve 330 does not unthread from the housing 102, thus releasing the high pressure within gas chamber 108.

It should be noted that, in the embodiment of FIG. 3, the cap 104 is a unitary body that threads into the proximal end of the housing 102. The cap 104 comprises both a proximal portion to which the fluid piping system attaches and a distal portion that attaches to the proximal end of the bellows 106 and provides a support portion 366 for interaction with the bellows support member 380. Other embodiments may not utilize a unitary body cap 104, however, and may use more than one component to accomplish the various functions of cap 104. For example, one or more first components, which may be collectively referred to as the cap, may be positioned within the housing 102 and act to capture the proximal end of the bellows 106 and/or to support the bellows support member 380 in the compressed position. One or more second components may then be positioned proximal to the cap and provide the function of fluidically coupling to the piping system. When the term cap is used herein, the term cap is not necessarily intended to require that the cap be the outermost component of the pulsation dampener that connects to the fluid piping system. Rather, the term cap is intended to mean at least the one or more components that captures the proximal end of the expandable bellows and supports the bellows support member, regardless of whether the cap also provides the connection to the piping system. Further, the cap does not necessarily have to be positioned within the housing in some embodiments. For example, the cap may comprise a component that thread onto an external thread of the housing and abuts a proximal end of a cavity defined by the housing. In some embodiments, the one or more components that captures the proximal end of the expandable bellows and/or supports the bellows support member is referred to as a support plate.

Bellows Support Member

FIG. 4 illustrates additional details of the bellows support member 380. FIG. 4 is a cross-sectional view of the bellows support member 380, and the shape of the bellows support member is desirably symmetrical about its longitudinal axis (e.g., the shape that would be formed by rotating the cross-section of FIG. 4 about the bellows support member's longitudinal axis). In addition to the cross-sectional view of the bellows support member 380, FIG. 4 also includes two vertical dashed lines 390 which are intended to represent the inner diameter of the expandable portion 354 of the bellows 106 (defined by the radial innermost edges of the folds of the expandable portion 354, as indicated in FIG. 3).

As shown in FIG. 4, the radial or lateral support portion 362 of the bellows support member 380 comprises a tapered shape having a larger diameter D3 at the top and a smaller diameter D2 at the bottom. Some embodiments may not use a tapered shape, and for example may use a cylindrical shape. It can be desirable to utilize an at least partially tapered shape, however, such as to reduce turbulence in the fluid flow in and out of the area between the folds of the expandable portion 354 and the area between the inner diameter 390 of the expandable portion 354 and the outer surface of the radial support portion 362. Utilizing a tapered shape can also help to minimize or eliminate trapping of fluid within the fluid chamber 110 when in the fully compressed position.

Regardless of whether the outer surface of the radial support portion 362 is tapered, cylindrical, or shaped otherwise, it can be desirable to maintain a relatively small total diametral clearance between the outer surface of the radial support portion 362 and the inner surface of the expandable portion 354 of the bellows (represented by diameter D1 across lines 390). Maintaining a relatively small total diametral clearance between these components can help to avoid having the expandable portion 354 collapse radially inwardly on itself when there is a high pressure differential between gas chamber 108 and liquid chamber 110 (or at least to avoid collapsing radially inwardly an amount sufficient to cause permanent deformation). For example, in some cases, the gas chamber 108 may be charged to 10,000 to 15,000 psi or higher, and the liquid chamber 110 may be at atmospheric pressure before connection to the piping system and/or before activation of the pump in the piping system. Without the bellows support member 380, and specifically the radial support portion 362 of the bellows support member 380, the expandable portion 354 could be caused to collapse too far radially inwardly, causing permanent damage and/or deformation to the bellows 106. In some embodiments, dimensions D1, D2, and D3 are approximately 1.45 inches, 1.275 inches, and 1.37 inches, respectively. Other dimensions may be used, however, including various dimensions corresponding to the diametral clearance ratios described below.

In some embodiments, a diametral clearance ratio is defined as the maximum total diametral clearance between the outer surface of the radial support portion 362 and the surface represented by lines 390 (diameter D1) when the expandable portion 354 is in a relaxed configuration (such as the position the expandable portion 354 will naturally remain in if there is no pressure differential between the gas chamber 108 and liquid chamber 110), divided by the same diameter D1. In some embodiments, the relaxed configuration is approximately halfway between the fully extended and fully compressed positions. For example, in the embodiment of FIG. 4 that comprises a tapered outer surface of the radial support portion 362, the maximum total diametrical clearance would be dimension D2 subtracted from D1. The diametral clearance ratio would then be that difference divided by diameter D1. In some embodiments, the diametral clearance ratio is desirably approximately 12%. In some embodiments, the diametral clearance ratio is desirably no greater than 5%, 7.5%, 10%, 12.5%, 15%, 17.5%, or 20%. In some embodiments, the diametral clearance ratio is desirably within a range of 5% to 15%, 7.5% to 20%, 5% to 17.5%, or 10% to 20%. It can be desirable to have at least some clearance between the radial support portion 362 and the inner diameter of the bellows 390, such as to allow fluid to pass therebetween, but it can also be desirable to not have too much clearance, which could lead to damage of the expandable portion 354 of the bellows when there is a high pressure differential between the gas chamber 108 and liquid chamber 110.

FIG. 4 also illustrates that the radial support portion 362 comprises a height H. The height H defines the longitudinal distance between the attachment portion 360 and the axial support portion 364. This can in some embodiments be an important dimension to help avoid damage to the bellows 106 when there is a high pressure differential between the gas chamber 108 and the liquid chamber 110. In some embodiments, it can be desirable for the height H of the radial support portion 362 to be configured such that, in the fully compressed position, where the axial support portion 364 is supported by support portion 366 of the cap 104, the radial innermost portions 390 of the plurality of folds, pleats, or corrugations are allowed to contact one another, and/or the opposing faces 391 of the individual folds, pleats, or corrugations are allowed to come into contact with each other and/or to be compressed together. This can be desirable, for example, because if the expandable portion 354 were still significantly expanded in the compressed position, then this would allow for additional space between the folds that the material of the expandable portion 354 could be deformed into by the high pressure in the gas chamber 108 and thus be permanently deformed or damaged. Stated another way, the more compressed the expandable portion 354 can be in the compressed position, the more the expandable portion 354 will tend to act like a solid thick-walled tube, and thus the more resistant the expandable portion 354 will be to lateral/radial movement and damage by a high pressure differential. The height H of the embodiment of FIG. 4 may be, for example, approximately 0.961 inches. As discussed further below, various heights H may be used to adapt the bellows support member 380 to different applications.

Although it can be desirable to compress the individual folds, pleats, or corrugations together in the compressed position, in some embodiments it may be desirable for the height H to be configured such that, in the fully compressed position, the radial innermost portions of the plurality of folds, pleats, or corrugations of the expandable portion 354 of the bellows (e.g., the portions that define inner diameter 390) are almost contacting one another but not quite contacting one another. This may, for example, help to avoid any liquid being trapped between the folds in the contracted position, while still maintaining at least some of the deformation limiting benefits of compressing the bellows into a solid tube-like structure.

The benefits described above are also some of the reasons why the configuration of FIG. 3 can be more desirable than a configuration where the liquid chamber is outside of the bellows and the gas chamber is inside of the bellows (e.g., if the locations of the gas and liquid chambers 108, 110 were reversed), particularly in high pressure situations. In such a configuration, if the gas inside of the bellow were pressurized to a high pressure (such as 10,000 to 15,000 psi or greater), and the liquid outside of the bellows were not pressurized (and the liquid chamber was not sealed off from the external piping system), then the bellows would tend to be stretched to its longest extension, and the innermost portion 390 of the folds of the expandable portion 354 would be forced radially outward. Stated another way, the individual folds, pleats, or corrugations would expand outward against the inner wall of the housing cavity, potentially even expanding the innermost portion 390 of the folds radially to be in contact with the inner wall of the housing. Such a situation may not necessarily damage a bellows having a high yield point, such as certain bellows made of rubber. Such a situation likely will damage a bellows having a lower yield point, however, such as a bellows made of PTFE. Testing has been conducted on such a design, and even as little of a pressure differential as 500 psi has been shown to cause permanent deformation to a PTFE bellows. On the other hand, testing has also been conducted on the design of FIG. 3, and even a pressure differential of 20,000 psi (i.e. 20,000 psi in gas chamber 108 with no counterbalancing pressure in liquid chamber 110) resulted in no apparent damage to the bellows 106.

In some embodiments, the height H can be described as a ratio or percentage of the full mechanical stroke of the distal end 352 of the bellows 106. For example, the full mechanical stroke may be defined as the longitudinal distance that the distal end 352 of the bellows 106 travels between the fully compressed position (when the axial support portion 364 of the bellows support member 380 is supported by the support portion 366 of the cap 104), and the fully extended position (if the distal end 352 were to extend far enough to come in contact with the distal surface 353 of the gas chamber 108. It should be noted that this definition of the full mechanical stroke is used for the purposes of defining the height H as a ratio or percentage of that stroke; but, in normal use, it may not necessarily be intended that the distal end 352 ever come in contact with the distal surface of the gas chamber 108. In some embodiments, it can be desirable for the height H to be approximately 90% of the full mechanical stroke. In some embodiments, it can be desirable for the height H to be approximately, no more than, or no less than 70%, 80%, 90%, 100%, 110%, 120%, or 130% of the full mechanical stroke. In some embodiments, it can be desirable for the height H to be within a range of 70 to 110% or 80 to 100% of the full mechanical stroke. In some embodiments, keeping the ratio to approximately 90% or within a range of approximately 80 to 100% can be desirable to achieve relatively high pulsation dampening capability within a reasonably sized overall package, while still maintaining the ability to resist a high pressure differential between the gas chamber 108 and liquid chamber 110 without permanent damage or deformation to the bellows 106. The height H can also be determined by the distance between the interior surface of the distal end of the bellows 106 and the distal face of the cap 104 (e.g., the two surfaces that contact the surfaces of the bellows support member 380 that define height H in the compressed position) when the bellows 106 is fully compressed. The bellows 106 being fully compressed may be defined as the point at which adjacent pleats of the expandable portion 354 come into contact with each other and/or are compressed together sufficiently to remove any void between the adjacent pleats. This can be an important distinction because, if the bellows comprises PTFE or other relatively flexible materials, it may be technically possible to further compress the bellows beyond such a point, although permanent damage to the bellows could be caused by such further compression. In order to prevent such damage, while still maintaining most or all of the benefits of having the bellows be fully compressed or at least close to fully compressed when the bellows support member 380 contacts the cap 104, the height H may desirably be within a range of 100% to 105% of the distance between the inner surface of the distal end of the bellows 106 and the distal face of the cap 104 when the bellows 106 is fully compressed. In some embodiments, the desirable range of H may be 100% to 110% or 95% to 110%. In some embodiments, the height H is desirably equal to or greater than the distance between the inner surface of the distal end of the bellows 106 and the distal face of the cap 104 when the bellows 106 is fully compressed.

Although, as described above, the embodiment illustrated in FIG. 3 preferably does not form a fluid tight seal between the bellows support member 380 and support portion 366 of the cap 104 in the compressed configuration, some embodiments may form a fluid tight seal between those components in the compressed configuration. For example, the manufacturing of the components may maintain close enough tolerances that a fluid tight seal (or substantially fluid tight seal) is formed without the aid of additional seals. Alternatively, one or more seals, such as O-rings or gaskets, may be included to form a fluid tight seal when in the compressed position. One reason such a configuration may be desirable, is that such a configuration could trap liquid between the folds of the expandable portion 354 of the bellows in the compressed configuration, and due to liquids generally being noncompressible, the trapped liquid could desirably further help to keep the bellows 106 from collapsing in on itself in the compressed position when there is a high pressure differential between gas chamber 108 and liquid chamber 110. As noted above, however, it can also be desirable to have a design that does not trap liquid within the bellows, and accordingly some embodiments do not form a fluid tight seal between the bellows support member 380 and the cap 104 in the compressed position.

Bellows Sealing Configuration

Figure 5:
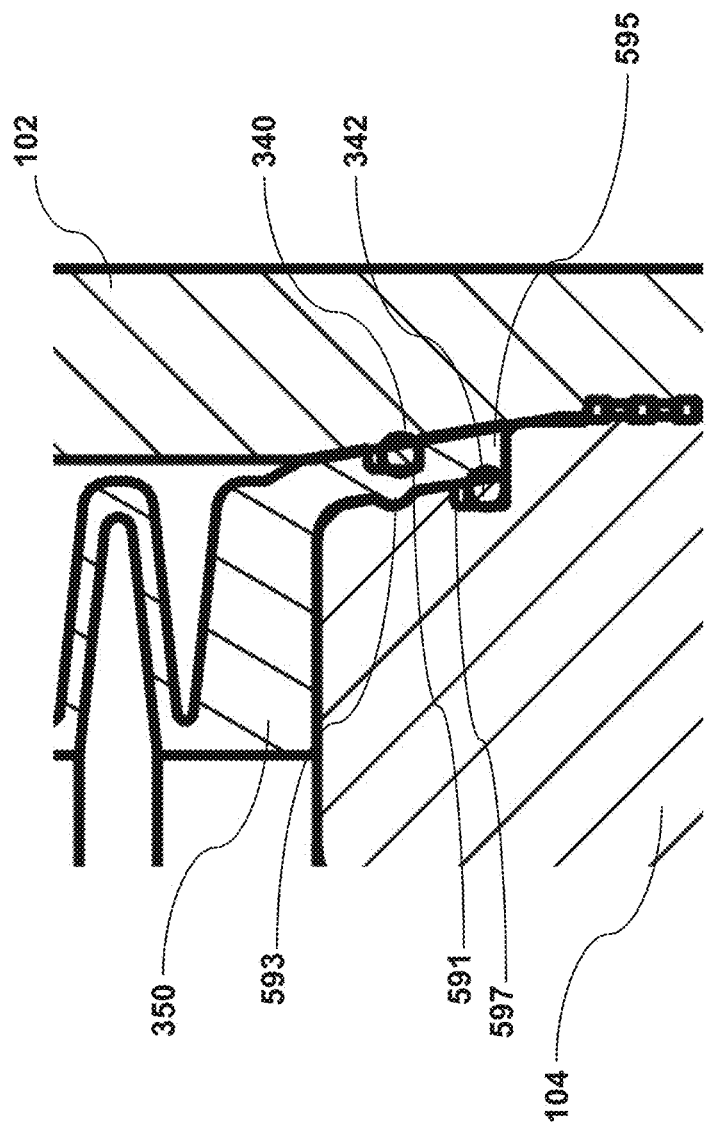
FIG. 5 is an enlarged cross-section view of a portion of the pulsation dampener of FIG. 1A.

FIG. 5 illustrates an enlarged cross-sectional view of a portion of the pulsation dampener 100 of FIG. 3. Specifically, the enlarged cross-sectional view of FIG. 5 illustrates a portion of the sealing configuration that captures the proximal end 350 of the bellows between the housing 102 and cap 104. The proximal end of the bellows 350 comprises a proximally extending flange 595 that is desirably captured between a distal end of the cap 104 and an inner wall of the housing 102. Desirably, the flange 595, and the walls it is captured between, comprise a tapered shape that has a smaller diameter at the top or distal end than the diameter at the bottom or proximal end. Such a tapered shape can be beneficial, for example, because it can help to ensure adequate compression of the O-rings 340, 342 and/or the flange 595 when the cap 104 is screwed into the housing 102.

Alternatively, adequate compression of these components to seal the assembly could be achieved by having the flange 595 extend directly radially outwardly (e.g., extending perpendicular to a longitudinal axis of the assembly). Such a configuration could have potential problems, however, because a large bending or transverse stress would be applied to the base of the flange 595 when the bellows is at the fully expanded position. Stressing that joint repeatedly could eventually lead to failure. Another alternative configuration could have the flange 595 extend directly downward (e.g., extending parallel to the longitudinal axis of the assembly). While such a configuration may minimize bending or transverse stress at the base of the flange 595, sealing between the flange 595, cap 104, and housing 102 may not be ideal (and/or the structural connection between these components may not be ideal), because there would be little or no compression of the flange 595 itself. The design illustrated in FIG. 5 addresses these problems, for example, by having the flange 595 extend at an angle between parallel and perpendicular to the longitudinal axis, which can limit the bending or transverse stress on the base of the flange 595, while also allowing some compression of the flange 595 when the cap 104 is tightened into the housing 102.

With continued reference to FIG. 5, the flange 595 in this embodiment comprises one groove 591 that O-ring 340 fits into. Further, the cap 104 comprises a groove 597 that O-ring 342 fits into. In other embodiments, the grooves may be positioned differently, such as there being no grooves in the flange 595 or one or both of the O-rings 340, 342 having corresponding grooves in the flange 595. FIG. 5 further illustrates that the flange 595 has a radial inward protrusion 593 extending therefrom. This protrusion can be configured to fit into a corresponding groove of the cap 104. This feature may, for example, be beneficial to retain the bellows to the cap 104 during assembly. In some embodiments, it can be desirable to position the protrusion 593 radially adjacent to the groove 591, such as to increase a wall thickness of the flange 595 in that area.

Additional High Pressure Fluid Pulsation Dampener Embodiment

Figure 6B:
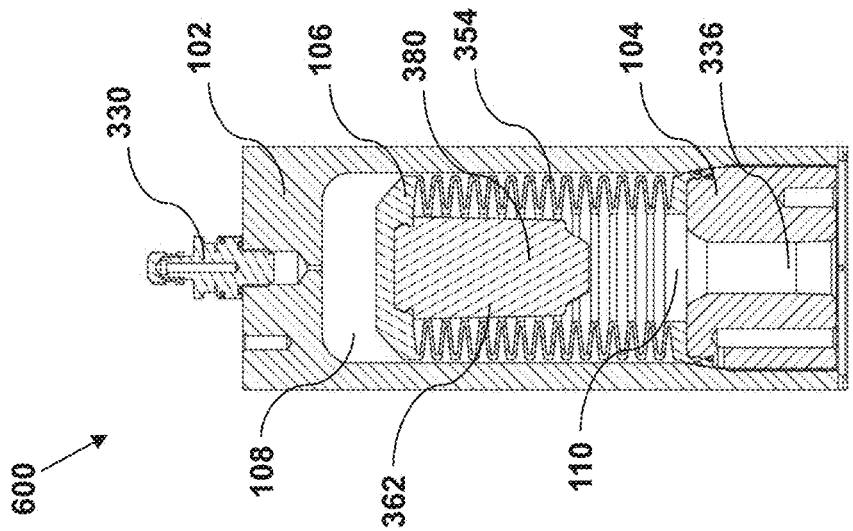
FIG. 6B is a cross-sectional view of the pulsation dampener of FIG. 6A.
Figure 6A:
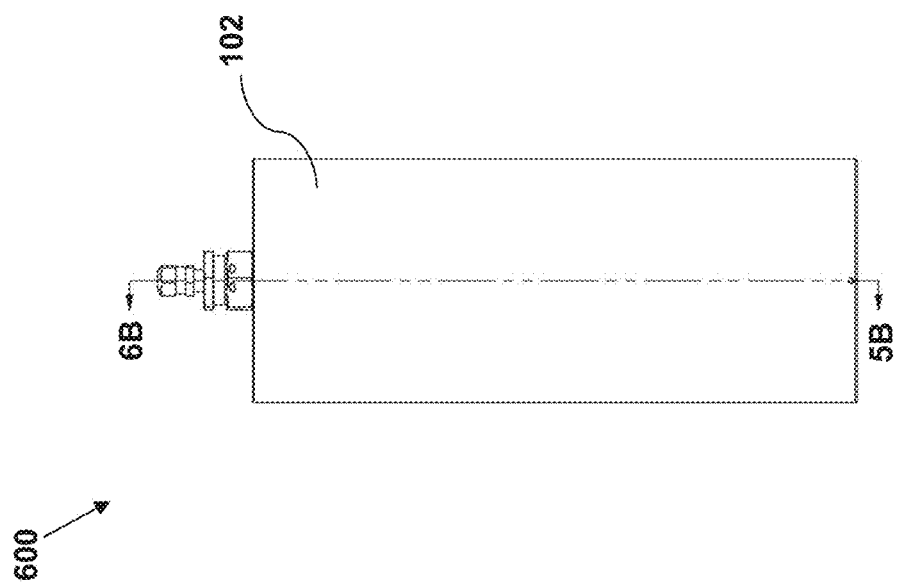
FIG. 6A is a side view of another embodiment of a pulsation dampener.

Turning now to FIGS. 6A and 6B, these figures illustrate an additional embodiment of a fluid pulsation dampener 600. FIG. 6A is a side view, and FIG. 6B is a cross-sectional view. The fluid pulsation dampener 600 is similar in many respects to the fluid pulsation dampener 100 described above, and the same reference numbers are used to indicate similar features. Further, the description above of pulsation dampener 100 is incorporated by reference in this section, and this section only focuses on the differences between pulsation dampener 600 and pulsation dampener 100.

The main difference between pulsation dampener 600 and pulsation dampener 100 is that pulsation dampener 600 of FIG. 6B is configured to have a longer mechanical stroke than pulsation dampener 100. Specifically, the internal cavity of the housing 102 is longer, the expandable portion 354 of the bellows 106 is longer, and the radial support portion 362 of the bellows support member 380 is longer. Having a longer mechanical stroke can, for example, enable the pulsation dampener 600 to more effectively dampen larger pressure spikes and/or pressure spikes that are longer in duration than with pulsation dampener 100. Desirably, the radial support portion 362 of the bellows support member 380 comprises a height H (see FIG. 4) that is a similar ratio to the full mechanical stroke as the height H of the radial support portion 362 of the bellows support member 380 of FIG. 4, as described above. Accordingly, although the bellows support member 380 of FIG. 6B is longer than the bellows support member 380 of FIGS. 3 and 4, the bellows support member 380 of FIG. 6B may still have a similar ratio of height to full mechanical stroke as the bellows support member 380 of FIGS. 3 and 5.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

What is claimed is:

1. A pulsation dampener comprising:
    a housing extending longitudinally from a first end to a second end, the housing having a longitudinally extending internal cavity;
    a cap attached to the first end of the housing, the cap having a proximal end and a distal end;
    an expandable polytetrafluoroethylene (PTFE) bellows positioned within the internal cavity of the housing, the expandable bellows comprising a proximal end attached to the distal end of the cap, a distal end that is movable within the internal cavity along the longitudinal direction, and an expansion portion comprising a plurality of pleats between the proximal and distal ends of the bellows;
    a bellows support member coupled to an interior side of the distal end of the expandable bellows and extending longitudinally away from the distal end of the expandable bellows toward the proximal end of the expandable bellows, the bellows support member comprising a rigid material having a tapered shape extending longitudinally adjacent the pleats of the bellows,
    wherein the bellows support member is sized such that, in a compressed configuration with the bellows support member in contact with the cap, opposing surfaces of adjacent pleats of the expandable bellows are forced into contact with one another,
    wherein a proximal end of the bellows support member comprises a tapered shape configured to engage and be laterally centered by a complementary tapered shape in the distal end of the cap when the expandable bellows is in the compressed configuration, and
    wherein the bellows support member is sized such that it fills at least 50% of a volume radially inward of the expandable portion of the bellows in the compressed configuration;
    a variable volume gas chamber defined by at least the internal cavity of the housing and an exterior surface of the expandable bellows;
    a gas valve in fluid communication with the variable volume gas chamber for introduction of gas into the variable volume gas chamber; and
    a variable volume liquid chamber defined at least by the cap, the bellows support member, and an interior surface of the expandable bellows.

2. The pulsation dampener of claim 1, wherein the interior side of the distal end of the expandable bellows comprises a cavity and a radially inward extending protrusion, and a distal end of the bellows support member comprises a protruding member shaped to fit at least partially within the cavity of the distal end of the expandable bellows and to be retained by the radially inward extending protrusion in a snap-fit arrangement.

3. The pulsation dampener of claim 1, wherein a radially inner surface of the plurality of pleats defines an inner diameter of the expandable bellows, and
    wherein, with the expandable bellows in a relaxed configuration, a total diametral clearance between the inner diameter of the expandable bellows and the tapered shape of the bellows support member extending longitudinally adjacent the pleats is no greater than 15% of the inner diameter of the expandable bellows.

4. The pulsation dampener of claim 1, wherein the bellows support member is sized such that it fills at least 75% of the volume radially inward of the expandable portion of the bellows in the compressed configuration.

5. The pulsation dampener of claim 1, wherein the pulsation dampener is capable of withstanding a situation in which the gas chamber has a pressure that is at least 10,000 psi greater than the pressure in the liquid chamber without permanent deformation to the expandable bellows.

6. A bellows assembly for a fluid pulsation dampener, the bellows assembly comprising:
    an expandable bellows having a proximal end, a distal end, and a longitudinally expandable portion extending between the proximal and distal ends; and
    a bellows support member coupled to an interior side of the distal end of the expandable bellows and extending longitudinally away from the distal end of the expandable bellows toward the proximal end of the expandable bellows,
    wherein the proximal end of the expandable bellows comprises an opening into a variable volume chamber defined by at least the distal end of the expandable bellows, the longitudinally expandable portion of the expandable bellows, and the bellows support member, and
    wherein the proximal end of the expandable bellows comprises a flange extending proximally, the flange comprising a larger diameter at a proximal end of the flange than at a distal end of the flange.

7. The bellows assembly of claim 6, wherein the longitudinally expandable portion of the expandable bellows comprises a plurality of pleats.

8. The bellows assembly of claim 7, wherein a radially inner surface of the plurality of pleats defines an inner diameter of the expandable bellows,
wherein the bellows support member comprises an attachment portion at a distal end of the bellows support member, an axial support portion at a proximal end of the bellows support member, and a radial support portion between the attachment portion and the axial support portion, and
wherein, with the expandable bellows in a relaxed configuration, a total diametral clearance between the inner diameter of the expandable bellows and the radial support portion of the bellows support member is no greater than 15% of the inner diameter of the expandable bellows.

9. The bellows assembly of claim 6, wherein at least the longitudinally expandable portion of the expandable bellows comprises polytetrafluoroethylene (PTFE).

10. The bellows assembly of claim 9, wherein the proximal end, distal end, and longitudinally expandable portion of the expandable bellows comprise PTFE.

11. The bellows assembly of claim 6, wherein the expandable bellows comprises a polymer, and the bellows support member comprises a material having a higher stiffness than the polymer of the expandable bellows.

12. The bellows assembly of claim 11, wherein the expandable bellows comprises polytetrafluoroethylene (PTFE) and the bellows support member comprises metal.

13. The bellows assembly of claim 6, wherein the flange comprises one or more annular grooves configured to accommodate an O-ring seal.

14. A pulsation dampener comprising:
a housing having in internal cavity;
an expandable bellows positioned within the internal cavity of the housing, the expandable bellows comprising a proximal end, a distal end, and an expandable portion between the proximal and distal ends,
wherein the proximal end of the expandable bellows is fixed with respect to the housing, and the distal end of the expandable bellows is movable within the internal cavity with respect to the housing;
a bellows support member coupled to an interior side of the distal end of the expandable bellows and extending longitudinally away from the distal end of the expandable bellows toward the proximal end of the expandable bellows;
a cap fixed with respect to the housing and positioned to support the bellows support member when the expandable bellows is in a longitudinally compressed configuration;
a first variable volume chamber defined by at least the internal cavity of the housing and an exterior surface of the expandable bellows; and
a second variable volume chamber defined by at least the cap, the bellows support member, and an interior surface of the expandable bellows,
wherein the proximal end of the expandable bellows comprises an opening into the second variable volume chamber, and
wherein the proximal end of the expandable bellows comprises a flange extending proximally, the flange comprising a larger diameter at a proximal end of the flange than at a distal end of the flange.

15. The pulsation dampener of claim 14, wherein the housing comprises a gas port in fluid communication with a gas valve for introduction of a gas into the first variable volume chamber, and the cap comprises a fluid port for introduction of a liquid into the second variable volume chamber.

16. The pulsation dampener of claim 14, wherein the expandable portion of the expandable bellows comprises a plurality of pleats, and a radially inner surface of the plurality of pleats defines an inner diameter of the expandable bellows,
wherein the bellows support member comprises an attachment portion at a distal end of the bellows support member, an axial support portion at a proximal end of the bellows support member, and a radial support portion between the attachment portion and the axial support portion, and
wherein, with the expandable bellows in a relaxed configuration, a total diametral clearance between the inner diameter of the expandable bellows and the radial support portion of the bellows support member is no greater than 15% of the inner diameter of the expandable bellows.

17. The pulsation dampener of claim 14, wherein the expandable bellows comprises a polymer, and the bellows support member comprises a material having a higher stiffness than the polymer of the expandable bellows.

18. The pulsation dampener of claim 17, wherein the expandable bellows comprises polytetrafluoroethylene (PTFE) and the bellows support member comprises metal.

19. The pulsation dampener of claim 14, wherein the flange comprises one or more annular grooves configured to accommodate an O-ring seal.

* * * * *